United States Patent Office 3,791,965
Patented Feb. 12, 1974

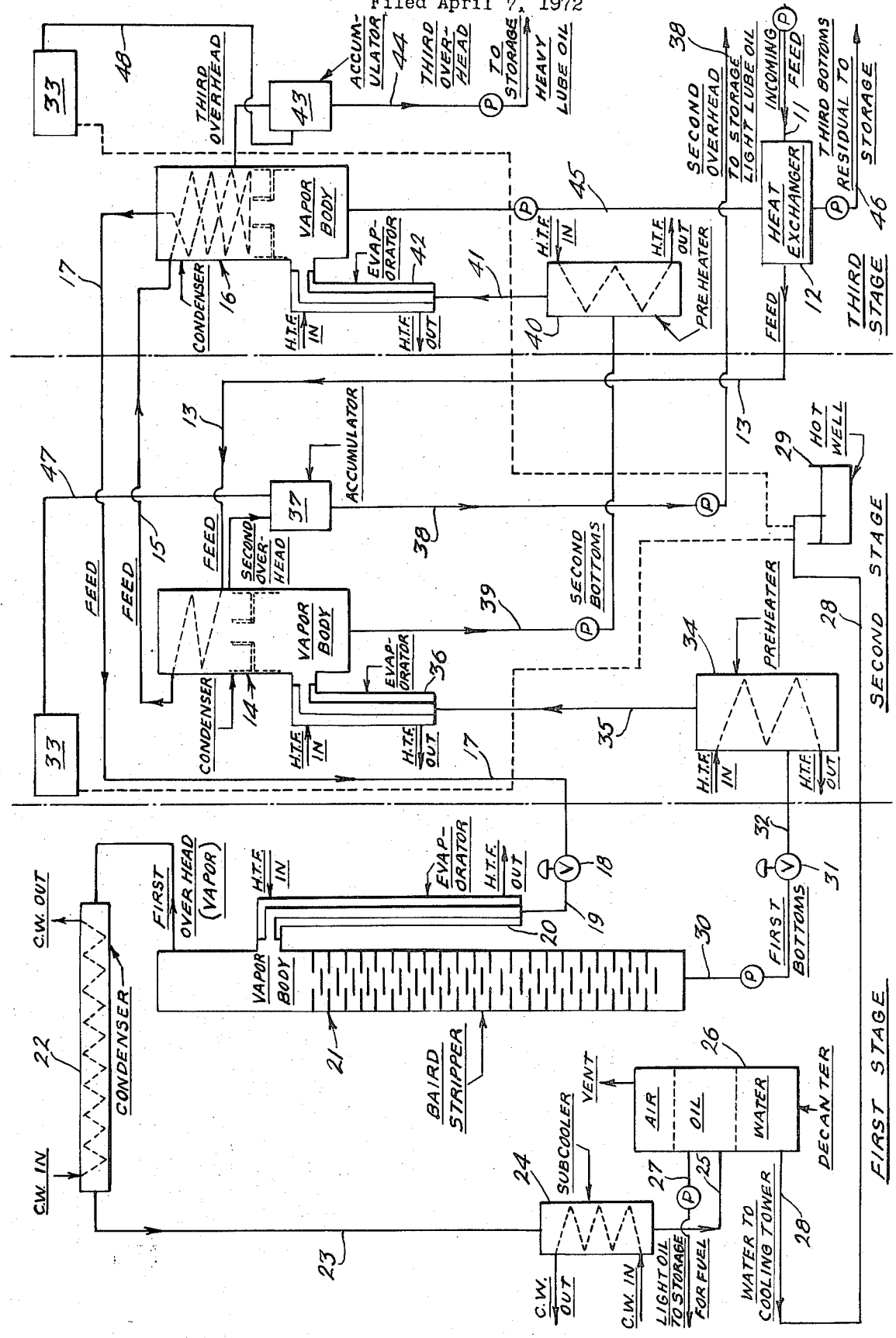

3,791,965
PROCESS FOR RE-REFINING USED
PETROLEUM PRODUCTS
Ogden Fitzsimons, Kimberton, Pa., Charles O. Radden, Westwood, Mass., and George J. Hindman, Pottstown, Pa., assignors to Petrocon Corporation, Valley Forge, Pa.
Filed Apr. 7, 1972, Ser. No. 241,985
Int. Cl. C10m 11/00
U.S. Cl. 208—179    20 Claims

ABSTRACT OF THE DISCLOSURE

An ecologically clean process for recovering a valuable light hydrocarbon fuel, one or more lube stocks and an asphalt-like residue, is described in which the raw feed stock consisting of accumulated used petroleum products is first heated by indirect heat exchange in the process itself and then subjected to a first stage stripping operation at atmospheric pressure and a temperature in the range from about 300 to 450° F. to remove the light hydrocarbon, water and volatile contaminants as an overhead and leaving a first bottoms, heating the first bottoms further and subjecting it to one or more additional flash distillations at a pressure in the range from about 1 to 40 torr (mm. Hg absolute) at a temperature in the range from about 590 to about 750° F. to separate one or more lube oil products and leave an asphalt-like residue. The light hydrocarbon product may be used in the process as fuel or sold. The stripped contaminated water is recycled for cooling purposes and either periodically incinerated, or a bleed stream is taken off and continuously incinerated to convert the contaminants to innocuous flue gases.

BACKGROUND OF THE INVENTION

In view of the widespread use of a variety of petroleum products for automotive and other purposes in which the products are not burned or otherwise consumed, large quantities of such products accumulate and present an ecological disposal problem. Familiar examples are used crank case oil, hydraulic transmission fluid and other materials of this type which are drained and collected at automotive service stations. Similarly, large volumes of used cuttings oils, rolling mill oils, petroleum based cleaning solvents and other materials of this type are generated by industrial operations. It is obvious that combustion or dumping of these materials as has been common practice is a serious source of pollution of the environment. Moreover, such disposal methods are obviously wasteful, not only in terms of the economic loss of the values in the waste products, but also in the failure to conserve the everdwindling supply of available petroleum. It has long been apparent, therefore, that it would be desirable to recover the values from the waste petroleum products and, due to the recent upsurge in interest in ecology, to do so with minimum pollution of the environment.

The prior art

Previous commercial processes for re-refining used crankcase oils and the like have involved rather complex separation techniques and cumbersome clay and acid treatments of the oil fractions obtained. Such processes have also had the disadvantage of producing foul smelling, acidic and objectionable residues which have presented serious disposal problems since such materials, when discharged into bodies of water, for example, cause serious pollution. These problems have been recognized and solutions sought. An example is the process described in Chambers U.S. Pat. 3,173,859. The Chambers process involves the purification and reclamation of feed stocks comprising crankcase oils and the like to obtain sharp cuts of substantially odor and color free lubricating oils. In this process the feed stock is subjected to a first multi-stage fractional distillation including both stripping and rectification in a bubble cap tower at atmospheric pressure to obtain a first overhead product, a first bottoms product, and a lube oil forecut as a side stream. The feed stock is fed between the fifth and sixth trays in a fourteen-tray fractional distillation column to insure substantial rectification. The first overhead fraction is condensed to obtain a first substantially dry reflux stream and a first water fraction. The temperature of the reflux stream is maintained above the boiling point of water at the operating pressure in order to keep it dry. The first water fraction is subjected to gravity separation to obtain a heads product and a first substantially oil-free water fraction containing the dissolved impurities. The first bottoms fraction is then subjected to a second multi-stage fractional distillation with rectification under vacuum to obtain a second overhead product, a second bottoms product and a plurality of sharp cuts of lubricating oil as side streams. The second overhead product is condensed to obtain an oil fraction and a second water fraction. The second water fraction is also subjected to gravity separation to remove the oil components and obtain a second oil-free water fraction also containing dissolved impurities. The two oil-free water fractions are then steam-stripped to remove the dissolved impurities.

It is noted that Chambers utilizes the water content of the feed stock as a carrying medium during the vaporization of the heavy lubricating oil fractions during the distillation-fractionation process. Further water is introduced into the second fractional distillation, under vacuum, by the use of high temperature steam. Therefore, the cumulative water fractions collected from each fractional distillation stage, which are contaminated with the usual phenolic, sulfur-containing and other noxious impurities, require the purification of substantial volume of water by the steam stripping operation referred to above. All of the stripped impurities are recycled in water to Chambers' decanter D-1. Oil components from this water fraction separate out and float on the water. These oil components which comprise the foul smelling heads product, are either drawn off and stored or combined with the lube oil forecut and returned to the first fractionation tower as reflux. The water fraction which includes the water-soluble impurities such as soluble organic oils and phenolic compounds is removed and returned to the water stripper A–3 where it is stripped and the impurities returned to the decanter. It is apparent, therefore, that in the Chambers process the impurities are either permitted to build up in the system for periodic removal or are removed continuously and stored; no solution to the disposal problem being suggested.

In view of the foregoing, it is a primary object of the present invention to provide a relatively simple and compact system for re-refining used petroleum products to recover the valuable portions thereof and provide for the disposal of the remainder without pollution of the environment.

It is another object of the invention to provide such a process in which only simple and flash distillation techniques rather than multi-stage fractional distillation with rectification is required as in the prior art.

It is still another object of the invention to avoid the presence of water in the distilled and/or the need for the introduction of steam to any vacuum distillation operation in order to reduce the load on the vacuum equipment and to avoid increasing the amount of contaminated water in the system, thus minimizing the problem of its disposal to the environment.

It is another object of the invention to provide a process for re-refining used oils in a compact apparatus of relatively low cost.

It is another object to provide a process for the recovery of lube oil stocks from used oils in which cracking of the hydrocarbons is minimized by the use of short contact times, particularly at cracking temperatures.

It is still another object of the invention to avoid the use of fired heaters as in the prior art and to employ indirect heating by means of a fluid heat transfer medium to obviate cracking of the hydrocarbon stocks in the evaporators due to high film temperatures.

It is another object of the invention to permit the process oil to be subjected to higher temperatures than would otherwise be possible without cracking due to the short duration of the processing, consequently increasing the recovery of lubricating oil values.

It is another object of the invention to neutralize any acid present in the used petroleum-product feed stocks in order to avoid damage to the apparatus by corrosion.

It is another object of the invention to employ ammonia or an equivalent alkaline material in the neutralization of the feed stocks to convert acidic materials present to water soluble salts which can be easily removed from the system without causing clogging or scaling.

It is still another object of the invention to remove the noxious impurities from the waste oil stocks and concentrate them in a form which is readily disposable by combustion to produce only harmless flue gases causing no pollution of the environment.

The foregoing and other objects of the invention and the manner in which they are achieved will become apparent from the following description of the new process.

BRIEF DESCRIPTION OF THE INVENTION

The new process for re-refining used petroleum products comprises at least two, and preferably three, separate distillation stages at successively higher temperatures and lower pressures. The first stage of the process, which is carried out at atmospheric pressure and a temperature in the range from about 300 to 450° F., is a combination flash distillation and multi-stage stripping operation. The more volatile hydrocarbon components, any water present in the feed stock, and the water-soluble impurities are flashed out of the feed stock as vapor as the feed stock, under a pressure of about 90 to 130° p.s.i.g., is permitted to expand to atmospheric pressure in an evaporator. The less volatile liquid portion of the feed stock leaves the evaporator and descends over heated fractionation elements such as tubes and discs in a multi-stage stripping column such as (Baird U.S. Pat. 3,198,241) countercurrent to steam, preferably superheated to a temperature in the range from about 400 ot 500° F., such as 450° F., which aids in removing and vaporizing the odoriferous and other impurities in the descending liquid feed stock and passing them into the overhead with the vapors from the first evaporator.

The overhead from the first stage evaporation-stripping operation is condensed by indirect heat exchange with cooling water from the common cooling tower and the condensate is separated by gravity into an oil phase and an aqueous phase. The oil portion is useful as fuel in the process or otherwise. The aqueous phase containing the soluble impurities is recycled to the cooling tower initially. When the soluble impurities, primarily inorganic salts, have built up to a substantial degree in the cooling water in the system, a bleed steam may be removed and incinerated, the loss being made up by the addition of fresh water. As will be explained further below, due to the nature of the soluble impurities, incineration of the bleed steam converts it to harmless flue gases and water vapor which may be discharged to the atmosphere without pollution.

The remaining liquid portion of the feed stock, the first bottoms, is heated further and introduced to the second stage evaporator, which is maintained at a pressure in the range from about 1 to 40 torr at a temperature in the range from about 590 to about 750° F. A second portion of the feed stock is flashed off in this way and condensed to form a lube oil product.

In the preferred embodiment of the invention, rather than flashing off all of the valuable lube oil in a single stage, two vacuum distillation stages follow the first stage stripping operation, each at a higher temperature and lower pressure than the former stage. More specifically, in the preferred three-stage pocess, the second stage flash distillation is carried out at a temperature in the range from about 590 to about 750° F., peferably about 600° F., at a pressure in the range from about 6 to 40 torr. The overhead from this flash distillation is condensed to give a light hydrocarbon lube stock, having an API gravity of about 32; a viscosity of about 100 SUS at 100° F., and 41 SUS at 210° F.; i.e. S.A.E. 10.

In the preferred three-stage process, the bottoms from such a second stage distillation are heated further within the about 590 to about 750° F. range, e.g. to about 625° F., and flash distilled at a pressure in the range from about 1 to 5 torr to produce an overhead, which on condensation is a heavy lube oil having an API gravity of about 30; a viscosity of about 350 SUS at 100° F. or 58 SUS at 210° F.; i.e., S.A.E. 30.

The bottoms from the third stage flash distillation, or from the broad second stage distillation if only two stages are employed, is a viscous material similar to asphalt having a viscosity in excess of 20,000 SFS at 122° F. and 1,550 cs. at 210° F., and which is useful as an asphalt substitute and for other purposes.

In the new process about 20% of the original feed will be evaporated in the first stage. Of this overhead material about 23% will be light fuel oil and about 77% water. In the two-stage process about 45 to 70% of the original feed stock is taken off as lube oil depending upon the temperature and pressure at which the distillation is carried out. In the three-stage process, about 30 to about 50% of the original feed stock will be taken off as a light lube oil in the second stage and about 10 to about 30% as a heavy lube oil in the third stage. The residual bottoms will normally amount to about 10 to about 20% of the raw feed. The proportions given above will, of course, vary with the composition of the feed stock and the temperature and pressure of each of the stages of the process, and will not necessarily fall within the ranges given above.

It should be noted that in the present process the residence time of the oil in the first stage evaporator-stripper, eliminating the cooler material in the stripper bottom, will be very short, i.e. on the order of about 2 to about 5 seconds. In the second and third stage distillations the residence time in the evaporator will be only about 1 to 3 seconds. This is compared to residence times of from about 20 to 40 minutes in the corresponding fraction distillation operation of the prior art.

Cooling water is supplied to the first stage condenser and subcooler from a common cooling tower to provide indirect heat exchange; none of this water coming into contact with the process oil or vapors. Water entering with the feed stock and introduced thereto by the steam used for stripping in the first stage at atmospheric pressure is all removed in the first stage overhead, separated in the decanter as noted above and sent to a common hot well. Steam used to create the vacuum employed in the second and third stages never comes into direct contact with the process oils or vapors and is also condensed and sent to the common hot well. The water from the hot well is cycled to the common cooling tower. Make-up water to replace that lost by evaporation in the cooling tower and hot well is added to the cooling tower as necessary. Therefore, all water entering the system from any source is recycled to the common cooling tower. Although the water separated from the feed stock contains soluble impurities including phenols and other organic materials, bacteria which will develop in the cooling system will convert much if not all of the organic matter to water and carbon dioxide. It may be necessary, initially or from time to time, to inoculate the cooling tower water with a selected bacteria strain of those now available for this purpose. Since as noted above, the condensation from the steam jets, water entering with the feed stock and any water produced by the digestion of the organic impurities, will be insufficient to replace that lost by evaporation, it will be necessary to add make-up water. If such make-up water contains any mineral or other impurities these will, of course, build up in the system. For this reason, the cooling water supply is replaced either periodically or continuously to avoid scaling or clogging of the apparatus by deposition of solids from the cooling water. Also, as noted above, water withdrawn from the cooling system is not discharged to the environment as such but is incinerated in order to convert it to water vapor, carbon dioxide or other innocuous vapors which will not pollute the atmosphere.

Inasmuch as accumulated used petroleum products normally contain foreign materials, the re-refining operation, as such, is preferably preceded by the separation of gross solid impurities by a suitable method such as gravity separation, i.e. settling, or preferably by screening. The feed stock is then subjected to the first stage operation described above which separates the remaining contaminants such as finely divided dirt, oil additives, water, and the like as described above. An alkaline material, such as anhydrous ammonia may be sparged into the stripper below the lowermost stripping element to neutralize any acid present in order to prevent corrosion. Steam is also employed in the first stage atmospheric stripping operation to aid in removing the fetid materials from the feed stock to the first stage overhead.

The first stage stripping operation is a rather simple separation requiring only three to four theoretical plates. While any suitable column such as a packed column or one employing bubble cap trays, sieve trays or the like could be used, the Baird disc and tube column is preferred because of its inherent low pressure drop and because it is not subject to clogging by deposition of dirt, sludge, oxidation products, mixed oil additives, and the like, as would be the case with other columns, particularly packed columns. Inasmuch as the Baird disc and tube devices have an efficiency of about 10 to 15%, about 24 such devices will be required to be the equivalent of four theoretical trays, including the initial flash vaporization. The Baird column is also advantageous because the internal structure of the column is subject to being heated by a circulating heat transfer fluid (HTF) such as Dowtherm fluid, to maintain a high rate of evaporation as the oil descends the column. As noted above, the stripping of fetid materials, oxidation products and the like is also facilitated in the Baird column by introducing steam at the bottom to flow upwardly countercurrent to the descending oil. This is necessary due to the flashing off of the water and naphtha in the top of the first stage evaporator, which leaves insufficient volatile matter in the lower sections of the Baird column to adequately remove the heavier fetid material in the descending liquid film.

One of the advantages of the present invention is that it permits the use of a relatively compact apparatus thus saving in construction costs. To this end, it is desirable to operate with no lower pressure in the second stage of the process than is necessary to provide the desired product at the operating temperature selected. The reason for this is that the lower the operating pressure, the larger the equipment must be. The temperature, of course, has a direct influence on the operating pressure. While temperatures up to 750° F. may be employed in the new process since the short residence times minimize cracking of the hydrocarbons, it is still preferred not to employ temperatures in excess of about 650° F., and preferably about 600° F. in the second stage and about 625° F. in the third stage. Therefore, the pressure in the second stage may be as low as 6 torr in a three-stage process, or as low as 1 torr in a two-stage process. It is preferred to operate the second stage at about 6 to 10 torr and the third stage at about 2 to 5 torr in order to avoid the necessity for the use of the larger and more expensive apparatus which would be required by lower operating pressures.

In view of the foregoing, it is apparent that the present invention provides a method for recovering the values of used petroleum products in a simple, compact system, without pollution of the environment. It is also noted that the reclamation of these values is accomplished without resort to the acid treatment or multi-stage fractionation and rectification procedures of the prior art and without the use of steam in any operation under vacuum. The process also avoids the cracking of hydrocarbons by the use of very short contact times at cracking temperatures and by the use of the even heat provided by a circulating heat transfer fluid rather than by fired heaters.

DETAILED DESCRIPTION OF THE INVENTION

The invention will now be described in greater detail in conjunction with the accompanying drawing which is a simplified schematic flow sheet representing a preferred embodiment of the process. The raw feed stock, which as noted above may be comprised of a wide variety of used liquid petroleum products, whether from automotive or industrial sources, ranging from mineral spirits to about S.A.E. 60 weight oil, is passed through a screen, not shown, suitably 100 mesh, to remove large foreign bodies and is then accumulated in a suitable storage tank, not shown. The screened feed stock is then introduced to the re-refining system through line 11 at the right of the drawing by a suitable pump. The feed stock is passed through a heat exchanger 12, which may be of any suitable design such as two concentric pipes, to heat the feed stock to a temperature in the range from about 100 to about 200° F., preferably about 165° F. The heat for this purpose is derived by passing the third stage bottoms product through the outer pipe of the heat exchanger on its way to storage. The partially heated feed stock is then passed through line 13 into the top of the second stage condenser 14 which also acts as a heat exchanger; the feed entering at a temperature such as 165° F. in the range from about 100 to about 200° F. This condenser-heat exchanger 14 may also be of any suitable design, such as a coil within an enclosed chamber. Heat is supplied to the feed stock in the coil by passing the vapor from the second stage evaporator through the surrounding chamber of the heat exchanger in order to heat the feed stock to a temperature in the range from about 200 to about 300° F., e.g., 270° F.

The feed stock is then passed out of the second stage condenser 14 at the top through line 15 to the top of the third stage condenser 16, which is suitably of the same coil and chamber type as 14, and which also acts as a heat exchanger. The feed stock enters the coil of condenser 16 at a temperature in the range from about 200 to about 300° F., such as 270° F., and leaves the top of the condenser through line 17 at a higher temperature in the range from about 250 to about 350° F., such as 325° F. The heat for this purpose is supplied by passing the vapor from the third stage evaporator through the chamber of the third stage condenser 16. The hot feed stock then passes through line 17 to a back pressure valve 18 of conventional design. Line 19 exiting from the opposite side of back pressure valve 18 leads into the bottom of the first stage evaporator 20 which may be of the shell and tube type or any other suitable design. The pressure in line 17 is in the range from about 90 to about 130 p.s.i.g., such as 115 p.s.i.g., for example. The valve 18 permits the pressure in line 17 to drop to a pressure close to atmospheric pressure, for example about 5 to 15 p.s.i.g., which is sufficient to maintain flow in the line 19 to the bottom of the first stage evaporator 20.

The first stage evaporator 20 is heated by passing a suitable heat transfer fluid (HTF) such as Dowtherm fluid through the shell of the exchanger. Inlet and outlet lines are shown in the drawing for the heat exchange fluid (HTF) which is circulated through these and connecting lines in a system including a suitable heater, not shown, according to conventional practice. The feed stock is partially evaporated in the evaporator 20 and passed into the first stage stripper 21 as a liquid-vapor mixture at point between the middle and the top of this apparatus. The mixed phase vapor-liquid mixture enters the apparatus 21 at a temperature in the range from about 300 to 450° F., for example at 400° F. at atmospheric pressure. The apparatus 21 consists of a lower evaporator-stripper portion of the type described in S. L. Baird U.S. Pat. 3,198,241, the entire disclosure of which patent is incorporated herein by reference. Hereinafter references to the Baird patent will be made by using the reference numerals of that patent prefixed by the letter B to differentiate them from like reference numerals referring to the system of the present invention. The hot feed stock leaving the first stage evaporator 20 at a temperature in the range from about 300 to 450° F., such as 400° F., as noted above, is a mixed phase vapor-liquid mixture which, as noted above, is introduced at a point intermediate the middle and top of apparatus 21 which is above the top of the Baird stripper. The Baird stripper forming a part of the apparatus 21 is heated by a circulating heat exchange medium, such as Dowtherm fluid, supplied from the heat transfer fluid (HTF) system including heater and supply lines, not shown, previously referred to herein. The vapor portion of the liquid-vapor feed entering the apparatus 21 rises into the upper vapor separation portion thereof while the liquid portion falls onto the uppermost disc plate B-36 of the Baird stripper in the lower portion of the apparatus 21.

The vaporized portion of the feed stock in the apparatus 21 rises in the upper portion thereof which is simply an unobstructed column and exits at the top through a suitable conduit leading into the first stage condenser 22. This condenser 22 is simply a heat exchanger of conventional design such as the shell and tube type. As shown in the drawing, the condenser 22 is provided with inlet and outlet means for the circulation of cooling water in the shell around the tube carrying the vapors from the apparatus 21. The cooling water may be at any suitable temperature up to a maximum of about 88° F. in the particular condenser referred to herein, but this will, of course, depend upon the design of any particular system. The vapors entering the condenser, which consist of light hydrocarbon vapors and water vapor, will be at a temperature in the range from about 340 to about 400° F., for example at about 385° F., and will be cooled to a temperature in the range from about 150 to 200° F. maximum.

The condensate or first overhead from the first stage condenser 22 is led by gravity flow through line 23 to a subcooler 24, which may suitably be of the concentric pipe type, and further cooled from 150 to 200° F. to ambient temperature. This is accomplished by circulating cooling water through the shell of the subcooler from the common cooling tower, not shown, which is also the source of cooling water used in the condenser 22. If desired, the hydrocarbon vapor and water vapor mixture exiting the upper portion of apparatus 21 may be cooled to ambient temperature in a single stage in a single cooling apparatus of suitable design.

The condensed hydrocarbon-water mixture, at ambient temperature, is then passed through a suitable conduit 25 to a decanter 26 which is simply a vented tank in which the liquid mixture is permitted to separate by gravity into a lower water phase and a supernatant hydrocarbon phase above which an air space is provided which is vented to the atmosphere as previously noted. Line 27 exists from the decanter 26 at a point below the hydrocarbon-air interface but above the hydrocarbon-water interface and permits the condensed hydrocarbons to be drawn off and used as fuel for the steam boiler and heat transfer fluid heaters in the system, referred to above but not shown, to supply the heat necessary for the process as a whole. This fuel oil is a very low viscosity, low flash point material and any excess beyond that which is needed for fuel in the present process can be sold. Line 28 existing from below the hydrocarbon-water interface in the decanter 26 permits withdrawal of water which is recycled to the cooling tower (not shown) via the hot well 29. The hot well is an open tank in which the water from the decanter and from the jet condensers is accumulated and pumped to the cooling tower, not shown, for re-use as cooling water in the system.

Returning now to the apparatus 21, the liquid portion of the partially evaporated feed stock exiting from the first stage evaporator 20, as noted previously, enters the apparatus 21 and falls onto the uppermost disc plate B-36 of the Baird evaporator-stripper in the lower portion of apparatus 21. As described more fully in Baird U.S. Pat. 3,198,241, the liquid portion of the feed stock falls over a series of disc and tube units maintained at a temperature somewhat above that of the feed stock to provide a large surface area which facilitates separation of the relatively volatile from the relatively non-volatile components of the feed stock. The liquid feed stock enters the Baird evaporator-stripper portion of the apparatus 21 at a temperature in the range from about 300 to 450° F., for example about 400° F. and is raised to a temperature in the range from about 440 to about 480° F., such as 450° F., in the apparatus as it descends. As previously noted, heat is supplied to the Baird apparatus by a circulating heat transfer fluid (HTF) such as Dowtherm from the source of this material in the system referred to previously. The temperature of the feed stock is regulated within the 440 to 480° F. range in order to ensure the desired separation of the relatively volatile and non-volatile components of the feed stock. More specifically, the temperature should not be permitted to fall below about 440° F. since at lower temperatures separation of the relatively volatile components would be inadequate. On the other hand, it would be undersirable to permit operation at temperatures above about 480° F. since this would result in the loss of valuable lube product in the overhead, which as noted previously, is eventually used as fuel in the process and any excess sold.

In order to facilitate the stripping of ordoriferous materials from the feed stock, a small amount of steam is introduced to the lower portion of the Baird stripper through a sparger, not shown in the Baird drawing. In a plant designed to process 1,000 gals. or about 8,000 lbs./hr. of used oil, about 75 to about 200 lbs./hr., for example 150 lbs./hr., of steam is adequate for this purpose; the steam being introduced at a temperature in the range from about 400 to 500° F., or about 450° F. In other words, from about 0.009 to about 0.025 lbs. of steam/lb. oil/hr. may be used to facilitate stripping of the odoriferous materials. Therefore, in a plant processing 1,000 lbs./hr. of used oil only about 9 to 25 lbs./hr. of water will be introduced by the steam used in the first stage stripping operation.

An alkaline material is also introduced into the lower portion of the Baird stripper 21 during the first stage stripping operation in order to neutralize the acids normally present in used lubricants, for example, in order to protect the carbon steel parts of the apparatus from corrosion. While any suitable alkaline material may be used for this purpose, it is preferred to use ammonia because of its ready availability, low cost and ease of handling. The amount of alkaline material added will range from nil, if the feed stock is relatively free of acid, up to about 5% by weight of the water content of the feed stock, since any water present is generally acidic. Inasmuch as the acidity of the feed stock and/or its water content varies, it is not possible to specify the exact amount of alkaline material which will be required to prevent acid corrosion. Ammonia is the preferred alkaline material not only for reasons of convenience and economy, but because it does not materially increase the heat load on the system and because its salts, formed on neutralization of the acid, are soluble and, therefore, easily removed from the system with the waste water.

Returning now to the first stage apparatus 21, a line 30 exiting from the bottom thereof permits removal of the first bottoms, made up of relatively non-volatile hydrocarbons, which are moved by a pump to the second stage preheater 34. Flow in line 30 is controlled by a conventional liquid-level control device, not shown, which senses the level of liquid hydrocarbon in the bottom of the Baird evaporator-stripper 21 and opens and closes a control valve 31 in line 30. The valve 31 also acts as a pressure reducing valve since the pressure in the line 30 to the left of the control valve 31 is the pump pressure, e.g., about 2 to 5 lbs./in.$^2$ whereas the pressure on the right side of valve 31 in line 32 is reduced to about 6 to 40 torr, which is the operating pressure of the second stage evaporator.

The source of the partial vacuum in line 32 is a conventional 3-stage steam ejector vacuum system 33 which is connected through the second stage accumulator 35, condenser 14, evaporator 36, line 35, and preheater 34 to the line 32 as will appear more clearly hereinafter. Cooling water supplied to the vacuum apparatus 33 from the cooling tower, not shown, and condensed steam from the ejectors is passed to the common hot well 29 through a suitable conduit, shown in the drawing by a broken line, from whence the water is recycled to the cooling tower, as noted previously.

The bottoms from the first stage evaporation-stripping operation is passed from apparatus 21, as stated above, through line 30, pressure reducing valve 31 and line 32 into the second stage preheater 34. This preheater is heated with heat transfer fluid (HTF) at about 650° F., such as Dowtherm fluid, from the common system referred to previously. The first stage bottoms, which is the residue of the feed stock after removal of the light hydrocarbons and water as described above, enters the second stage preheater at a temperature in the range from about 440 to 480° F., e.g., 450° F., and exits from the preheater 34 in line 35 at a temperature in the range from about 540 to about 620° F., such as 600° F., and enters the second stage evaporator 36. The second stage evaporator 36 is similar in construction to the first stage evaporator 20 and is also supplied with Dowtherm heat transfer medium at about 650° F. to about 775° F. from the common source. The reduction in pressure from 2 to 5 lbs./in.$^2$ in line 30 to a pressure in the range from about 6 to 40 torr in line 32 causes some volatile material to flash from the first bottoms. Further heating causes further flashing of volatile material and consequent turbulent mixing in the evaporator 36 which is desirable to facilitate heat exchange. The resulting liquid-vapor mixture leaves the top of the evaporator 36 and passes into the lower chamber portion of the second stage condenser 14 at a temperature in the range from about 590 to about 750° F., such as 600° F. While the second stage evaporator normally heats the stock to only about 600° F., if necessary the stock may be heated as high as 750° F., although this is generally undesirable. Such high temperatures should, therefore, be employed only as necessitated by operation at the minimum second stage vacuum of about 40 torr. The condenser 14, as previously noted, acts as a heat exchanger for the feed stock in line 15 which passes through its coil. The vapors from the second stage evaporator coming into contact with the outside of the coil in 14 are cooled thereby thus condensing them to liquid at a temperature of about 420° F. or less, for example 400° F. It will be remembered that the feed stock from line 13 enters the coil of condenser 14 at a temperature in the range from about 100 to about 200° F. such as 165° F. thus providing the temperature differential required to cool the second stage overhead vapors from a temperature in the range from about 590 to about 750° F. down to 420° F. or less and condense them to liquid. The condensed second overhead flows by gravity feed into the second stage accumulator 37 which functions as a reservoir for a pump. The condensed hydrocarbons from the second stage accumulator 37 are pumped through line 38 to storage. This material is a light lubricating oil having a viscosity of about 100 SUS at 100° F. and 41 SUS at 210° F. and an API gravity of 32.

The relatively non-volatile bottoms portion of the lube oil from the second stage vapor body is withdrawn through line 39 and passed to the third stage preheater 40. The operation of the third stage of the process is essentially the same as that of the second stage except that it is carried out at a higher temperature and lower pressure. More specifically, the second stage bottoms enters the third stage preheater at a temperature in the range from about 530 to 560° F., e.g., 545° F. and leaves in line 41 at a temperature of about 590 to 750° F., e.g., 625° F. at a pressure of about 1 to 5 torr. Here again, temperatures in the higher portion of the range are preferably avoided due to the possibility of cracking of the hydrocarbons and loss of valuable lube oil. However, these high temperatures, up to about 750° F. may be employed, if necessary, when the minimum third stage vacuum of up to 5 torr is employed. As in the second stage, the higher the pressure, the higher the operating temperature required to obtain the desired separation of relatively volatile from relatively non-volatile hydrocarbons.

The vapor portion from the third stage evaporator 42 enters the third stage condenser 16 where it comes in contact with coils containing feed stock at a temperature in the range from about 200 to about 300° F., e.g., 270° F., which cools and condenses this material. The third stage overhead exits the condenser and flows into the accumulator at a temperature in the range from about 430 to about 450° F. and is then passed to storage through line 44. This material is a heavy lubricating oil having a viscosity of about 350 SUS at 100° F. and 58 SUS at 210° F., and an API gravity of 30.

The third stage bottoms which is drawn off from the third stage vapor body through line 45 exits at a temperature in the range from about 570 to about 600° F., e.g., 570° F. and is passed through the heat exchanger 12 to heat the incoming feed stock as previously stated. From the heat exchanger 12 the third bottoms is passed to storage through line 46. This residual material from the re-refining process is similar in many respects to asphalt. It has a viscosity in excess of 20,000 SFS at 122° F. and 1,550 cs. at 210° F. The asphalt-like material may be used as a substitute for asphalt.

While the process of the invention has been described as a two-or-three-stage process in conjunction with the preferred embodiment illustrated in the drawing, a fourth stage may also be employed, if desired. In this case, the third stage is operated at a temperature in the range from 590 to 750° F. at a pressure of about 2 to 5 torr and the third liquid bottoms is heated to a temperature of about 620 to about 750° F. and fed into a fourth vaporization zone having a pressure of about 1 to 4 torr and the fourth vapor condensed to give a third lube stock.

The light lube oil product of the process, i.e. the second stage overhead product, has a color less than 3 as determined by ASTM procedure D–1500 and a good odor. This product, as noted above, has a viscosity of about 100 SUS at 100° F. and 41 SUS at 210° F. and an API gravity of 32. This oil is useful as a base for producing motor oil, automatic transmission fluid, hydraulic oil, rolling mill oil, and cutting oil and the like.

The heavy oil product from the third stage overhead, has a color less than 4 by the ASTM D-1500 procedure and a good odor. The uses of this product are similar to those listed above for the lighter lube oil product.

It will be apparent to those skilled in the art that the process of the present invention is subject to variation from the preferred embodiment described above within the scope of the appended claims.

What is claimed is:

1. A process for the recovery of hydrocarbon values from used material containing liquid hydrocarbons which comprises:
    (a) heating a feed stock comprising used liquid hydrocarbons, water and contaminants to a temperature within the range from about 300 to about 450° F. in a closed zone whereby the heated feed stock is raised to an elevated pressure,
    (b) introducing said heated and pressurized feed stock to a first vaporization zone at a pressure below that of said feed stock whereby relatively volatile materials are flashed out of said feed stock as a first vapor,
    (c) permitting the remaining liquid portion of said feed stock to fall through a stripping zone over surfaces at a temperature above that of said liquid, whereby further volatile materials are separated from said feed stock and passed into said first vapor to leave a first liquid bottoms,
    (d) heating said first liquid bottoms to a temperature in the range from about 590 to about 750° F. and introducing said material into a second vaporization zone having a pressure in the range from about 1 to 40 torr, whereby a second vapor is flashed out of the said first liquid bottoms to leave a second liquid bottoms, and
    (e) condensing said second vapor to recover a hydrocarbon lube stock.

2. A process according to claim 1, wherein said feed stock is raised to a pressure within the range from about 90 to about 130 p.s.i.g., and said first vaporization zone is at about atmospheric pressure.

3. A process according to claim 1, wherein steam is introduced into the lower portion of said stripping zone and passed upwardly therethrough countercurrent to said falling feed stock to aid in stripping volatile contaminants from said feed stock, whereby said first bottoms is a liquid hydrocarbon material substantially free of water and volatile contaminants.

4. A process according to claim 1, wherein an alkaline material is introduced into said feed stock in an amount sufficient to substantially neutralize the acidity of said feed stock.

5. A process according to claim 4, wherein the alkaline material is ammonia.

6. A process according to claim 1, wherein said first vapor is condensed and permitted to separate by gravity into an oil phase and a water phase containing soluble contaminants, said water phase being recycled to the process as cooling water.

7. A process according to claim 6, wherein at least a portion of said oil phase is burned as a fuel to supply heat to the process.

8. A process according to claim 6, wherein a portion of the cooling water containing soluble contaminants is continuously withdrawn and incinerated.

9. A process for the recovery of hydrocarbon values from used material containing liquid hydrocarbons which comprises:
    (a) heating a feed stock comprising used liquid hydrocarbons, water and contaminants to a temperature within the range from about 300 to about 450° F. in a closed zone whereby the heated feed stock is raised to an elevated pressure,
    (b) introducing said heated and pressurized feed stock to a first vaporization zone at a pressure below that of said feed stock whereby relatively volatile materials are flashed out of said feed stock as a first vapor,
    (c) permitting the remaining liquid portion of said feed stock to fall through a stripping zone over surfaces at a temperature above that of said liquid, whereby further volatile materials are separated form said feed stock and passed into said first vapor to leave a first liquid bottoms,
    (d) heating said first liquid bottoms to a temperature in the range from about 590 to about 750° F. and introducing said material into a second vaporization zone having a pressure in the range from about 6 to about 40 torr, whereby a second vapor is flashed out of said first liquid bottoms to leave a second liquid bottoms,
    (e) condensing said second vapor to recover a first hydrocarbon lube stock,
    (f) passing said second liquid bottoms into a third vaporization zone having a pressure in the range from about 1 to about 5 torr, whereby a third vapor is flashed out of said second liquid bottoms to leave a third liquid bottoms, and,
    (g) condensing said third vapor to recover a second hydrocarbon lube stock.

10. A process according to claim 9, wherein said feed stock is raised to a pressure within the range from about 90 to about 130 p.s.i.g., and said first vaporization zone is at about atmospheric pressure.

11. A process according to claim 9, wherein steam is introduced into the lower portion of said stripping zone and passed upwardly therethrough countercurrent to said falling feed stock to aid in stripping volatile contaminants from said feed stock, whereby said first bottoms is a liquid hydrocarbon material substantially free of water and volatile contaminants.

12. A process according to claim 9, wherein an alkaline material is introduced into said feed stock in an amount sufficient to substantially neutralize the acidity of said feed stock.

13. A process according to claim 9, wherein the alkaline material is ammonia.

14. A process according to claim 9, wherein said first vapor is condensed and permitted to separate by gravity into an oil phase and a water phase containing soluble contaminants, said water phase being recycled to the process as cooling water.

15. A process according to claim 14, wherein at least a portion of said oil phase is burned as a fuel to supply heat to the process.

16. A process according to claim 14, wherein a portion of the cooling water containing soluble contaminants is continuously withdrawn and incinerated.

17. A process according to claim 10, wherein the first liquid bottoms is heated to a temperature of about 600° F. before being introduced to the second vaporization zone, and the second liquid bottoms is heated to a temperature of about 625° F. before being introduced to the third vaporization zone.

18. A process according to claim 17, wherein steam is introduced to the lower portion of said stripping zone and passed upwardly therethrough countercurrent to said falling feed stock to aid in stripping volatile contaminants from said feed stock, and anhydrous ammonia is introduced into the lower portion of said stripping zone in an amount sufficient to substantially neutralize the acidity of said feed stock.

19. A process according to claim 10, wherein said third liquid bottoms is heated to a temperature in the range from about 620° F. to about 750° F. and is introduced into a fourth vaporization zone having a pressure in the range from about 1 to about 4 torr whereby a fourth vapor is flashed out of said third liquid bottoms leaving a fourth bottoms, and said fourth vapor is condensed to recover a third hydrocarbon lube stock.

20. A process according to claim 19, wherein the alkaline material is ammonia.

References Cited

UNITED STATES PATENTS

| | | | |
|---|---|---|---|
| 3,173,859 | 3/1965 | Chambers | 208—184 |
| 3,489,676 | 1/1970 | Hu et al. | 208—179 |
| 3,304,255 | 2/1967 | Katsuta et al. | 208—179 |
| 3,198,241 | 8/1965 | Baird | 23—276 |

PAUL M. COUGHLAN, JR., Primary Examiner

J. M. NELSON, Assistant Examiner

U.S. Cl. X.R.

23—276; 208—183, 184